United States Patent
Dambricourt

(10) Patent No.: US 7,695,789 B2
(45) Date of Patent: *Apr. 13, 2010

(54) FULLY EMPTIABLE FLEXIBLE TUBE WITH AN AMPLIFIED RETURN EFFECT

(75) Inventor: Gery Bernard Marie Cornil Dambricourt, Escoutoux (FR)

(73) Assignee: CEP Industrie, Saint Remy sur Durolle (FR)

( * ) Notice: Subject to any disclaimer, the term of this patent is extended or adjusted under 35 U.S.C. 154(b) by 920 days.

This patent is subject to a terminal disclaimer.

(21) Appl. No.: 10/542,935

(22) PCT Filed: Jan. 14, 2004

(86) PCT No.: PCT/FR2004/000061

§ 371 (c)(1), (2), (4) Date: Mar. 9, 2006

(87) PCT Pub. No.: WO2004/074126

PCT Pub. Date: Sep. 2, 2004

(65) Prior Publication Data

US 2006/0204693 A1     Sep. 14, 2006

(30) Foreign Application Priority Data

Jan. 24, 2003   (FR) .................................. 03 00820

(51) Int. Cl.
   *B29D 23/20*   (2006.01)
   *H05B 6/00*   (2006.01)
   *B65D 37/00*   (2006.01)

(52) U.S. Cl. ...................... 428/35.7; 222/215; 264/478

(58) Field of Classification Search ................ 428/35.2, 428/36.9, 36.91; 433/81; 138/118; 222/215; 264/468

See application file for complete search history.

(56) References Cited

U.S. PATENT DOCUMENTS

| | | | | |
|---|---|---|---|---|
| 3,839,890 | A * | 10/1974 | Phlippoteau | 72/68 |
| 5,314,746 | A * | 5/1994 | Johnson et al. | 428/338 |
| 5,372,863 | A * | 12/1994 | Nishikawa | 428/36.6 |
| 6,342,564 | B1 * | 1/2002 | Pitkanen et al. | 525/191 |
| 6,695,169 | B1 * | 2/2004 | Dambricourt | 222/92 |
| 6,874,665 | B2 * | 4/2005 | Doherty et al. | 222/541.5 |
| 2002/0161096 | A1 * | 10/2002 | Loontjens et al. | 524/445 |
| 2003/0194521 | A1 * | 10/2003 | Dambricourt | 428/36.9 |

FOREIGN PATENT DOCUMENTS

| | | |
|---|---|---|
| EP | 1 181 207 B1 | 8/2003 |
| WO | WO 00/64769 | 11/2000 |
| WO | WO 01/68355 | * 9/2001 |

* cited by examiner

*Primary Examiner*—Rena L Dye
*Assistant Examiner*—Erik Kashnikow
(74) *Attorney, Agent, or Firm*—Bachman & LaPointe, P.C.

(57) ABSTRACT

A fully emptiable flexible tube wherein at least the skirt and the neck of the tube form a single-pieced unit. The wall is 0.30 1.20 mm thick, preferably 0.30 1.00 mm thick and is made of a material comprising at least one polymer from the polypropylene family and comprises a section modulus of 700 MPa maximum, preferably 500 MPa according to French standard NF EN ISO 178. The tubes can be used in the packaging of any type of product, especially pasty bodies in the field of cosmetics and pharmaceuticals.

39 Claims, 7 Drawing Sheets

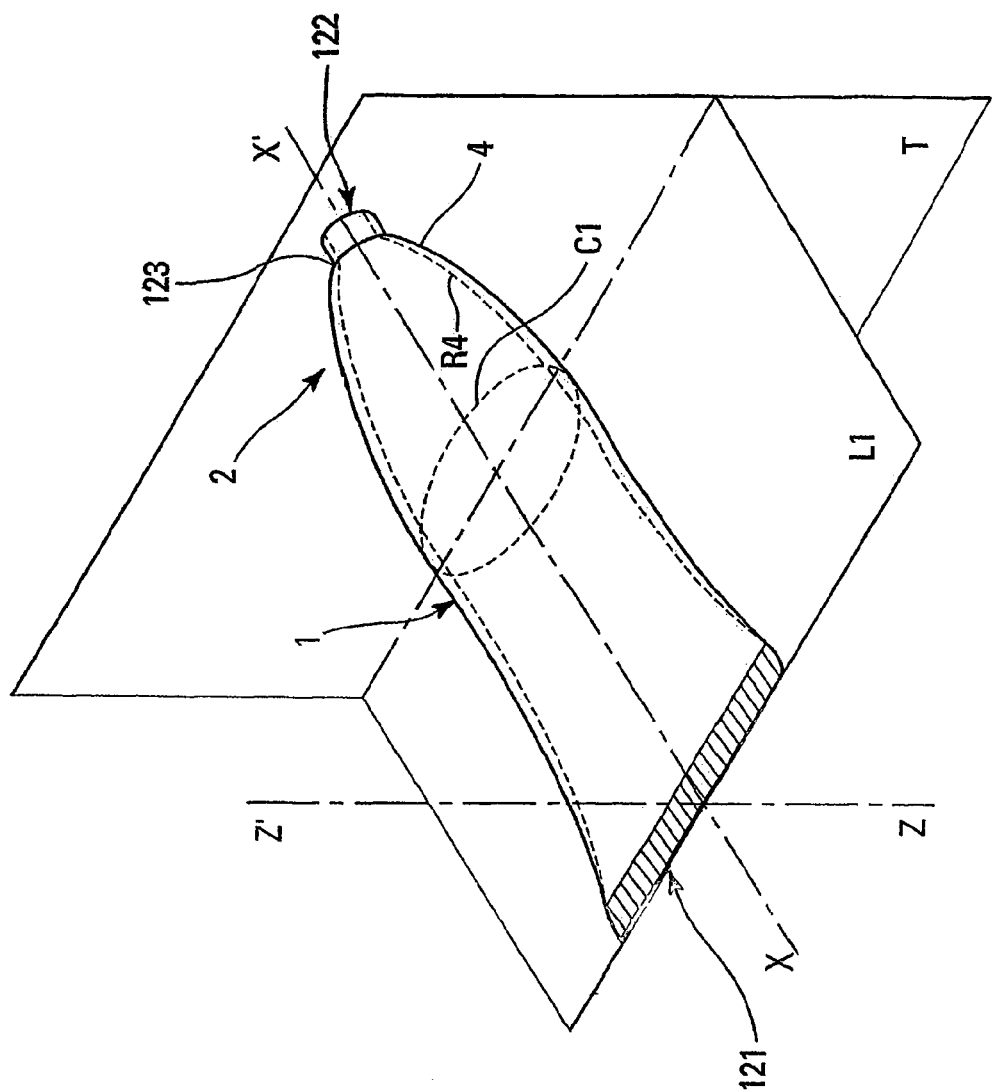
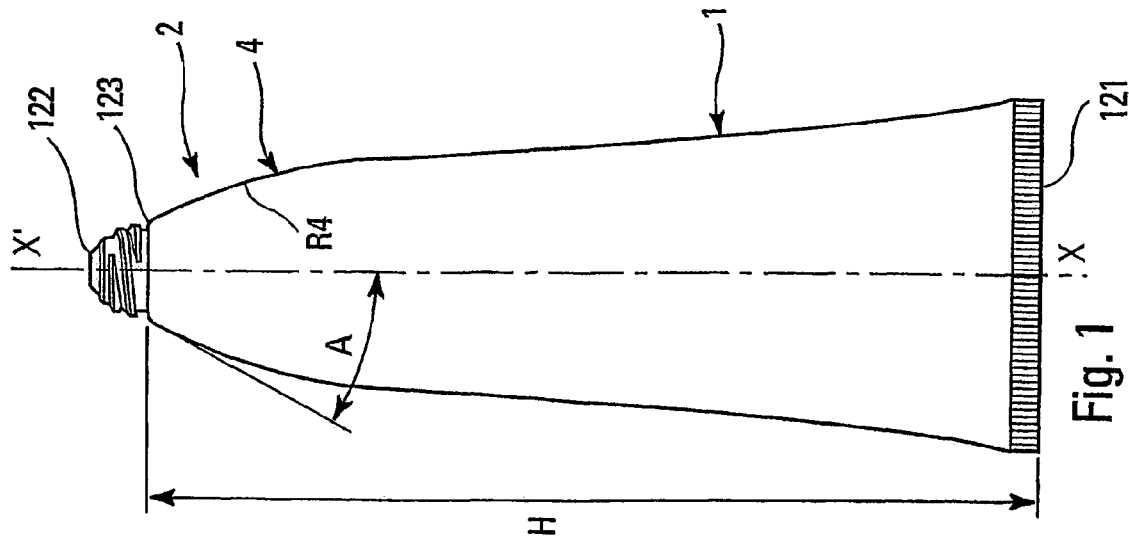

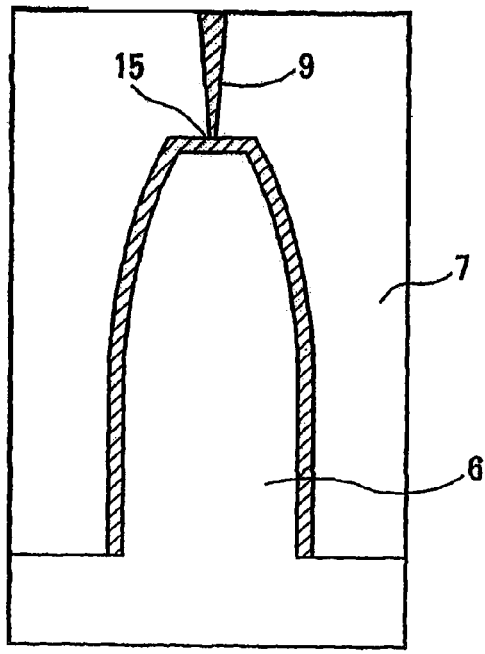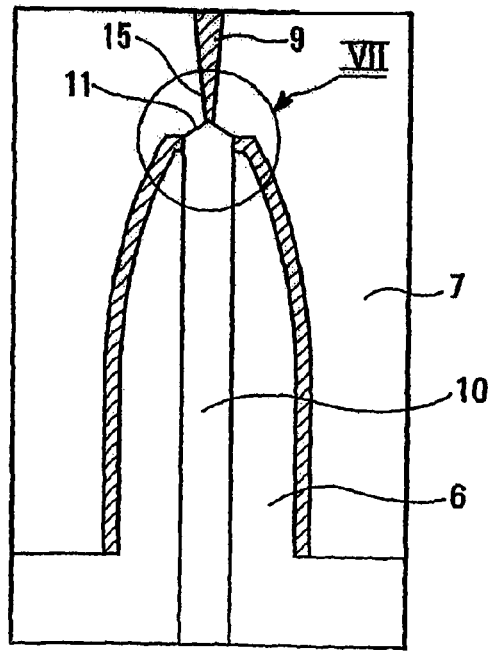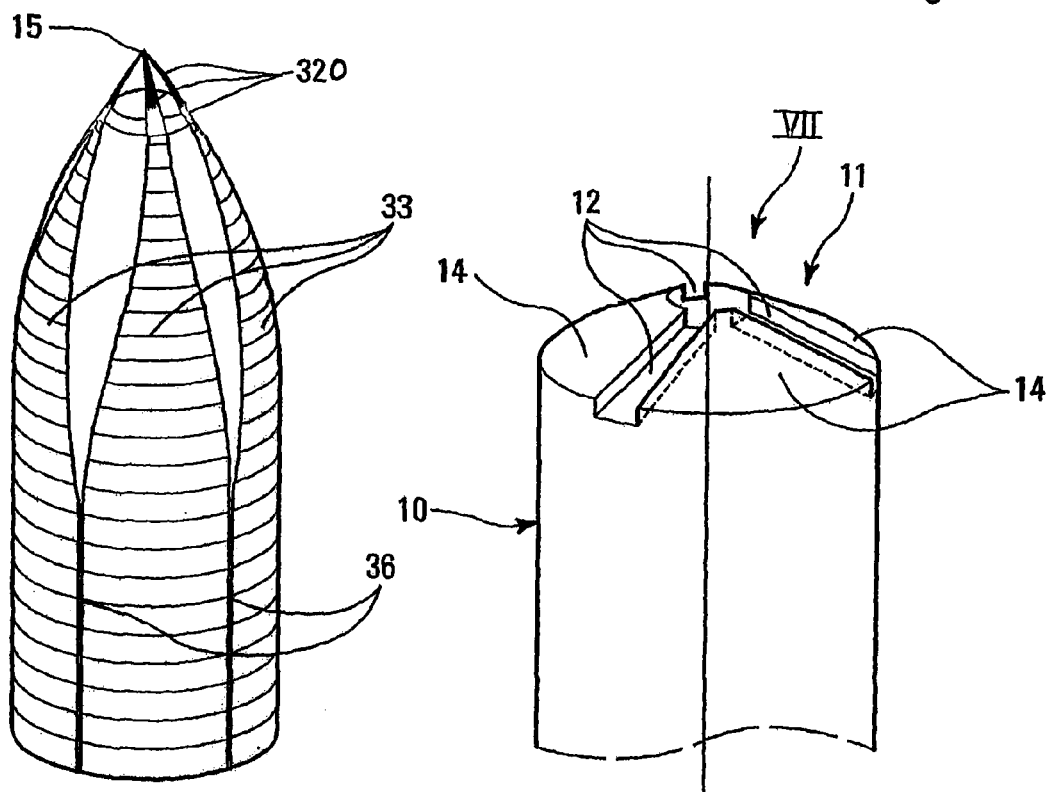
Fig. 5A Fig. 5B Fig. 6 Fig. 7

FULLY EMPTIABLE FLEXIBLE TUBE WITH AN AMPLIFIED RETURN EFFECT

BACKGROUND OF THE INVENTION (1) Field of the Invention

The invention generally pertains to a fully emptiable flexible tube resistant to stress-cracking and forming a water vapour barrier.

The invention also concerns a method for fabricating said tube.

More precisely, the invention, according to a first characteristic, concerns a fully emptiable tube provided with a wall resistant to stress-cracking and forming a water barrier, this tube essentially comprising a flexible skirt and a head, the skirt being elongate along an axial direction and having, at a first end of the tube, a filling end sealed by crushing this skirt along a transverse direction, and the head comprising at least one evacuation orifice and a flexible neck forming a radial extension of the orifice and being joined to the skirt, at least the skirt and neck forming a single piece assembly, the wall at the joining of the neck and skirt and in a longitudinal plane containing the axial direction and perpendicular to the transverse direction, having a determined joining radius, and the skirt in a plane transversal to the axial direction and at mid-distance between the neck end forming the evacuation opening and the filling end of the tube having a determined perimeter and a substantially constant wall thickness, the ratio of the determined perimeter to the joining radius being no more than 4.5.

(2) Prior Art

A tube of this type is described and illustrated for example in patent EP 1 181 207.

Paste products, such as toothpaste, pharmaceutical products, cosmetic products, food products, hygiene products, fats and greasy substances, putty and glue are often proposed in packaging of flexible tube type. These tubes consist of a tubular body of constant cross-section, before the filling end is sealed, of circular, oval or other shape. The tubular body forming what is called the "skirt" has a first end generally closed by heat sealing and a second opposite end, configured so as to form a dispensing head for the product contained in the skirt. The dispensing head is provided with screw-on, snap-fit or other closing means of so-called "standard" cap type, so-called "service" cap type or other.

As a general rule, heat sealing of the first end of the tube is made after filling the tube with the paste product to be packaged.

The capacity of the tube is one of its essential characteristics. In the particular case of a tube with constant circular cross-section, the capacity is defined by the length and diameter of the skirt, i.e. by the length and diameter of the circular cross-section of the skirt.

To extract the product from the tube, the consumer presses on the tube wall which undergoes deformation and creasing that are increasingly pronounced as and when the tube is emptied.

The tube skirt must therefore be made in a flexible material. This material must be heat sealable. It must also have characteristics of resistance to stress-cracking, imperviousness to water vapour and no yellowing in time under the effect of the products contained in the tube or through so-called "cross" contamination i.e. attributable to contamination agents external to the tube, in order to meet specifications of compatibility of products intended to be packaged in the tube.

Tubes meeting all these criteria are most often fabricated by assembly or insert moulding of the dispensing head made by injection and of the skirt made by extrusion.

Another method, called injection blow moulding, that is little used and costly, consists of forming the skirt by moving the impression of a mould consecutively to injection of the head in this mould.

Finally, at least the skirt and neck may be made by injection in a single operation as indicated in above-mentioned patent EP 1 181 207.

The fabrication of the tube using the injection method offers numerous advantages: this method can replace a succession of operations by a single operation. It chiefly allows great freedom of shape and eliminates the welding between the neck and skirt of the tube which is a rigid zone hence a factor of discomfort for the user.

The injection method combined with a low ratio between the skirt perimeter and the neck joining radius makes it possible to fabricate so-called "fully emptiable" tubes which can be completely emptied of their content by pressing on the, flexible neck.

The industrial production of these tubes in large series has encountered a major problem however, which up until now has considerably slowed down its extent of application, and which derives from the insufficient reversibility even the total lack of irreversibility of the deformation undergone by said fully emptiable tubes when they are being emptied.

This problem, novel by nature, in no way affects conventional tubes whose head has much greater rigidity than the skirt, and all the more since the skirt consists of a developable surface, cylindrical for example.

In this well-known case and illustrated for example in patent EP 0 856 473, the skirt only undergoes deformations that are topologically equivalent to creases and returns to its rest position under the effect of the substantial elastic return force exerted upon it by the head after being arched.

On the other hand, for fully emptiable tubes, and even in cases when the ratio of the skirt perimeter to the neck joining radius is low, preferably less than 4.5, the skirt's return to its initial shape after pinching of the tube neck is largely impeded by the fact that the neck, on account of its spheroid-type shape, undergoes compression tangential to its surface when pinched at every point of the surface on which pressure is exerted.

For a certain configuration of the tube's physical parameters, it may arise that not only the inversion of concavity which the tube neck undergoes in its zone on which most stress is placed on pinching, no longer has to overcome an elastic return force but is itself propagated to the benefit of an elastic force in reverse direction which tends to apply the neck zone undergoing most stress onto that part of the neck which maintains its initial convex shape.

SUMMARY OF THE INVENTION

It is the essential purpose of the present invention to propose a fully emptiable tube free of this defect.

For this purpose, the inventive tube, conforming to its generic definition given in the above preamble, is essentially characterized in that its wall, in a plane transversal to the axial direction and at mid-distance between the neck end forming the evacuation orifice and the tube filling end, has a median thickness of between 0.30 and 1.20 mm, preferably between 0.30 and 1.00 mm, in that it consists of a mixture of a number "n" at least equal to 1 of polymers belonging to the family of copolymers-olefins prepared from $C_2$ to $C_{10}$ monomers, in that at least a first polymer of the mixture belongs to the polypropylene family, and in that the constituent mixture of the tube wall has a flexural modulus of no more than 700 Mpa, and preferably no more than 500 Mpa according to standard NF EN ISO 178.

The tube of the invention also has other characteristics which, although optional, contribute towards imparting other qualities.

The polymer conventionally used for fabricating injected tubes is polyethylene which is well known to be a flexible material.

A first difficulty related to the use of another material, polypropylene in particular, derives from the greater rigidity of this other material, at first sight little recommended for fabricating flexible tubes.

A first solution used to overcome this difficulty lies in reducing the wall thickness of polypropylene-based tubes, polypropylene having the major advantage of resistance to stress-cracking to meet the demand of user industries seeking a higher melt flow than with polyethylene.

This approach is insufficient however to obtain a sufficiently flexible wall.

Therefore, in an optimised tube conforming to the invention, the first polymer preferably consists of copolymer of propylene and ethylene, for example a heterophase copolymer of propylene and ethylene.

The mixture of which the wall is composed may comprise at least one second polymer, consisting for example of a heterophase copolymer of propylene and ethylene or a linear $C_4$-$C_{10}$ copolymer of ethylene-olefin.

Preferably, the mixture forming the tube wall has a flexural modulus of between 100 and 350 MPa, and further preferably of between 150 and 300 MPa in accordance with standard NF EN ISO 178.

Advantageously, the length H of the tube, defined as the distance between the neck end and the filling end along axis XX' lies between 40 mm and 170 mm, and the wall in the transverse plane has a minimum thickness preferably equal to the square root of length H corrected by a multiplier coefficient of between 0.045 and 0.065, this multiplier coefficient further preferably lying between 0.050 and 0.060.

It is possible to give a value to the ratio of the determined skirt perimeter to the neck joining radius that is less than 3 and preferably a value of between 0.5 and 2.

Also the neck may, with respect to the axial direction, have a maximum incline of no more than 35° preferably no more than 30°.

Before heat-sealing the filling end, the skirt is defined for example by a generatrix that is non parallel to the axial direction.

In this case the generatrix of the skirt may, before heat-sealing the filling end of the tube, have a maximum incline of no more than 2° with respect to the axial direction of the tube, preferably in the region of 0.5°.

Before heat-sealing the skirt end, the generatrix of the skirt is advantageously a straight line.

Also, it is possible to provide that the skirt, as far as its joining to the neck, has a wall thickness having a first substantially constant value and substantially identical to the median thickness, that the neck in the vicinity of its end forming the evacuation orifice has a wall thickness having a second value greater than the first value, and that the wall thickness of the neck gradually decreases gradually from the second value to the first value from the evacuation orifice towards a neck point located at a determined distance from the joining of the neck to the skirt.

Preferably, the ratio of the second wall thickness value to the first wall thickness value is no more than 1.5.

To improve tube imperviousness, it may be coated in a barrier varnish over its entire surface including the neck.

The tube of the invention may be obtained by injection into injection mould comprising a core and an impression, the core itself comprising a central part of which a free end centre bears upon the impression at least during the injection phase of the tube skirt.

It is also useful to provide that the free end of the central part of the core comprises supply channels, and that the tube at its injection end has an apex wall formed at least in part of sectors corresponding to the supply channels.

In an optimal case when the central part of the core of the injection mould is mobile, the apex wall of the tube end is formed without any gaps after drawing the mobile central part back over a distance corresponding to the desired thickness of this apex wall.

The free end of the central part of the core may have a sunken cone shape, the angle γ formed by the bearing surface of this free end on the impression with the plane perpendicular to the longitudinal axis being less than 45°, preferably of between 15° and 20°.

However, the free end of the central part of the core may also be in the shape of a projecting cone frustum, the angle □ formed by the bearing surface of the projecting frustum of this free end on the impression and by the plane perpendicular to the longitudinal axis of the tube lying between 35° and 45°.

In this case, the free end of the central part of the core is advantageously in the shape of a sunken cone in its part internal to the projecting cone frustum, the angle δ formed by the bearing surface of the sunken cone of this free end on the impression with the plane perpendicular to the longitudinal axis of the tube being less than 45°, and preferably between 15° and 20°.

The head comprises single-piece securing means for example of nozzle type and a single-piece reducer, the nozzle and reducer being positioned in the continuation of the orifice along axis XX', the apex wall of the nozzle forming the reducer, the orifice of the reducer being obtained by cutting after forming the tube by injection, the tube, nozzle and reducer thereby forming a single-piece assembly formed by injection in a single operation.

Preferably, the wall of the single-piece nozzle carries an asymmetric thread.

Also it is possible to provide that the tube of the invention is equipped with capping means provided with a conical tip, that the tip enters into the orifice of the single-piece reducer, and that the tip places the reducer wall under centrifugal radial tension in the vicinity of the opening orifice.

The head may comprise single-piece securing means of nozzle type positioned in the continuation of the orifice along axis XX', the tube and the securing means forming a single-piece assembly formed by injection in a single operation.

The evacuation orifice may be machined by cutting after the forming operation by injection and the tube may be equipped with an added accessory of dispensing-means type of added reducer type or added nozzle tip, or securing means of added nozzle type forming a reducer or nozzle tip, or capping means of service cap type, the added accessory being positioned in the continuation of the orifice along axis XX'.

The added accessory may be equipped with a chimney of which an outer face is conjugated with the face parallel to axis XX' of the orifice, after inserting the chimney inside the orifice.

In this case, it is advantageous for the chimney of the added accessory to place the side wall of the orifice under centrifugal radial tension.

If the added accessory is non-removable, the chimney of the added accessory is fitted for example with a penetration device of conical shape, the outer face of the chimney being radially recessed with respect to the penetration device.

The determined perimeter of the skirt in the transverse plane lies between 75 and 190 mm for example.

Also, in the longitudinal plane of the tube, the neck has a radius of curvature which increases in a direction leading from the evacuation orifice towards the skirt.

The invention also concerns a method for fabricating a fully emptiable flexible tube formed of a skirt and a head comprising at least one evacuation orifice and a neck forming a radial extension of the orifice and joined to the skirt, at least the skirt and neck forming a single-piece assembly, resistant to stress-cracking and forming a water barrier, this method being characterized in that it comprises the steps consisting of:
  using as constituent material of the wall a mixture of a number "n" at least equal to 1 of polymers belonging to the family of copolymers-olefins prepared from $C_2$ to $C_{10}$ monomers, a first polymer belonging to the polypropylene family, the mixture of polymers having a flexural modulus of no more than 700 MPa, preferably no more than 500 MPa, the wall having a thickness of between 0.30 and 1.20 mm, preferably of between 0.30 and 1.00 mm,
  fabricating the skirt and head of the tube by injecting the mixture in a single injection operation into an injection mould comprising an impression and a core, said core comprising a central part of which a free upper end centre bears upon the impression at least during the injection of the skirt.

BRIEF DESCRIPTION OF THE DRAWINGS

The invention will be better understood and other purposes, advantages and characteristic will become more readily apparent on reading the following description made with reference to the appended drawings which illustrate non-limitative examples of implementation of the invention and in which:

FIG. 1 is a front view of a tube of the invention conforming to a first embodiment, seen after closure of the filling end.

FIG. 2 is a perspective view of the tube in FIG. 1.

FIG. 5A schematically shows a prior art mould used to form a tube by injection method.

FIG. 5B schematically shows a mould which can be used for the injection of the tube of the invention.

FIG. 6 schematically shows the injection flows during injection of the tube of the invention.

FIG. 7 is an enlarged, perspective view of the part denoted VII in FIG. 5B.

DETAILED DESCRIPTION OF THE PREFERRED EMBODIMENT(S)

As mentioned previously, the invention concerns a fully emptiable tube provided with a wall resistant to stress-cracking and forming a water barrier.

Said tube (FIGS. 1, 2, 3A, 3B, 3C, 3D, 4 and 4A) essentially comprises a flexible skirt 1 and a head 2, at least the skirt 1 and neck 4 being joined without discontinuity and forming a single-piece assembly.

Figure 4:
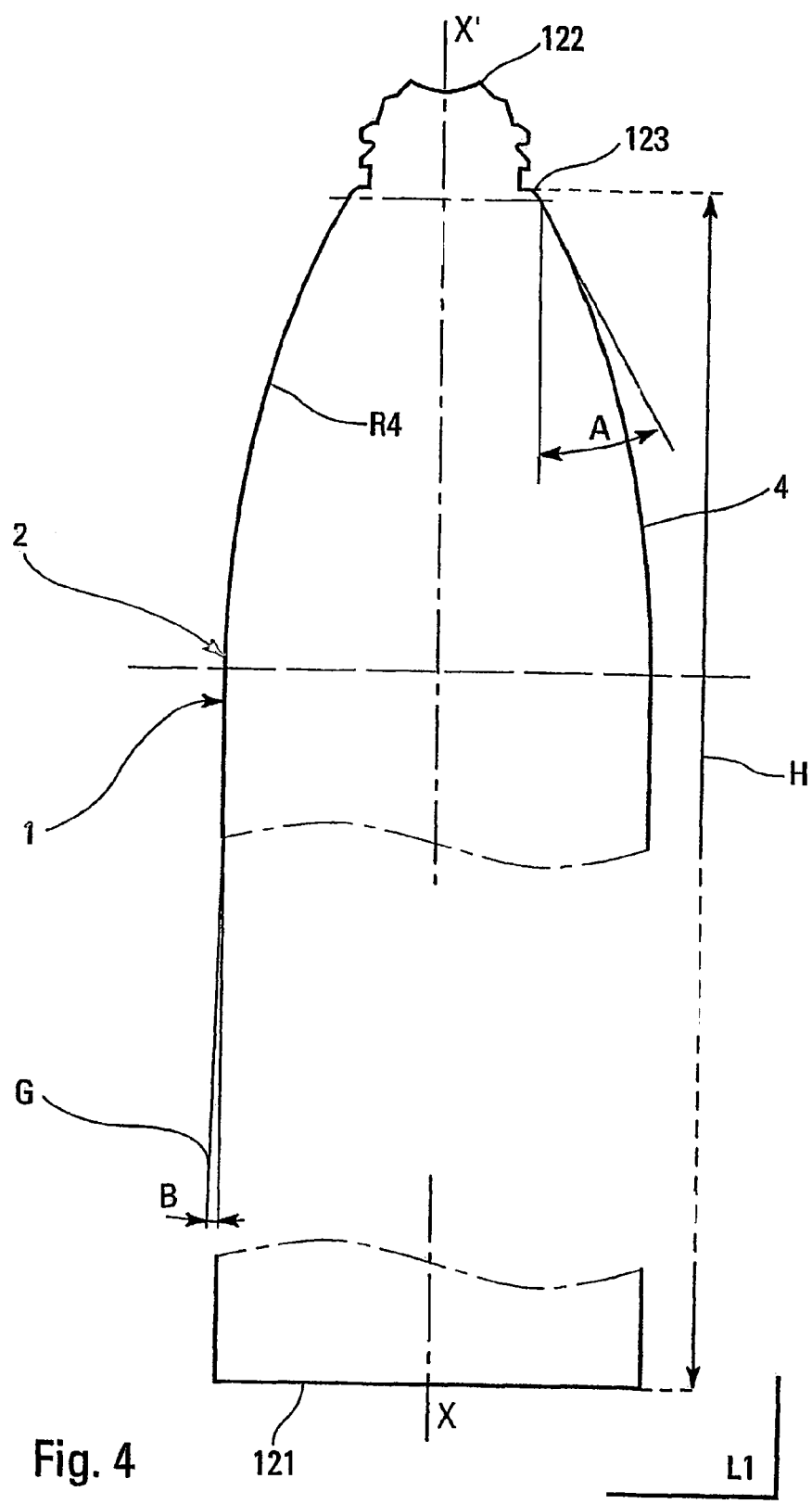
FIG. 4 is an enlarged front view of the tube of the invention, according to a first embodiment, before closure of the filling end.
Figure 4A:
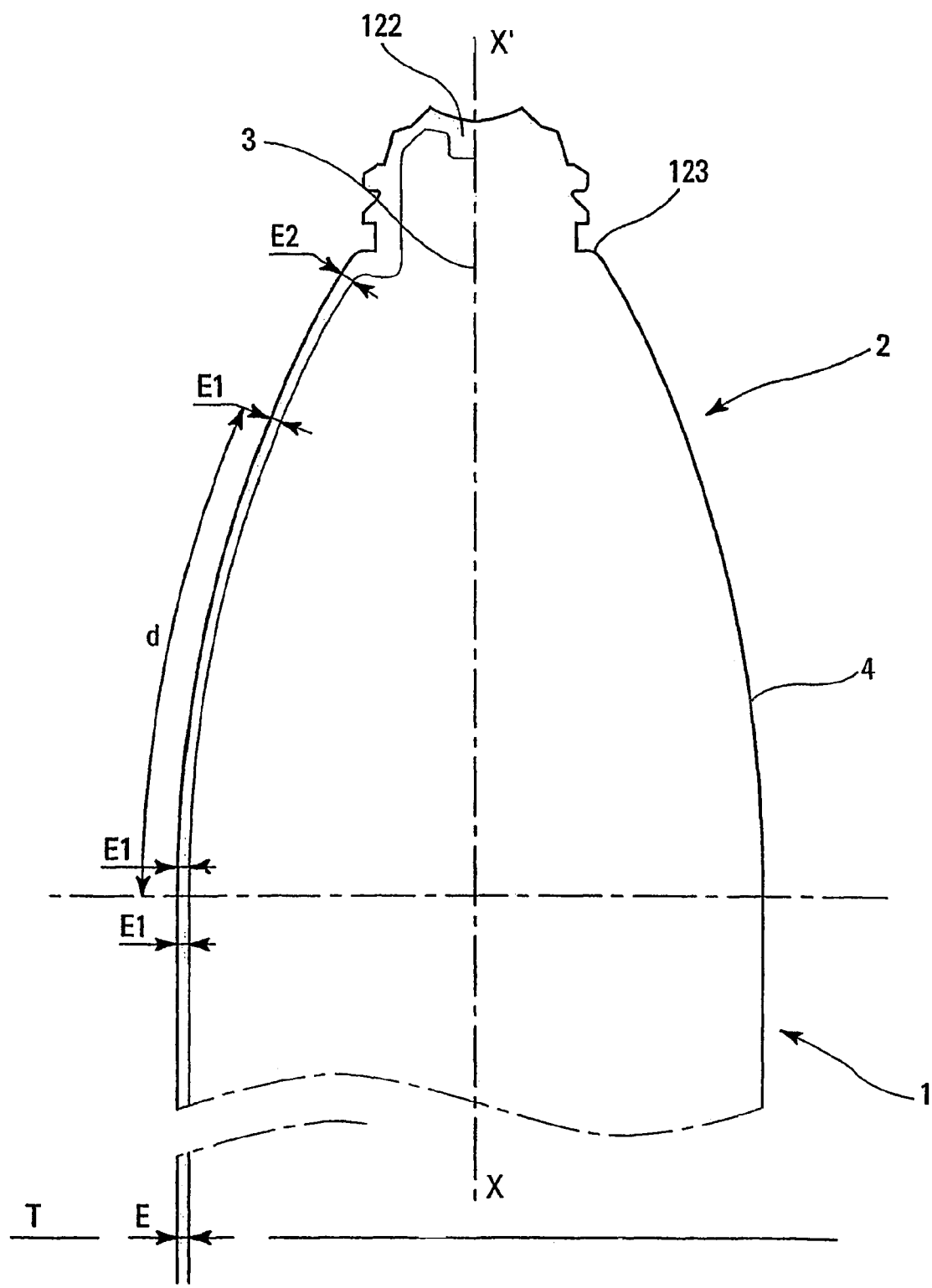
FIG. 4A is a cross-sectional view of the tube shown FIG. 4.

The skirt has an elongate shape along an axial direction XX' and ends with a filling end 121 which, after the product to be packaged has been inserted, is sealed by crushing this skirt 1 along a transverse direction ZZ'. FIGS. 1 and 2 show a tube whose filling end 121 is heat sealed whilst FIG. 4 shows the same tube, before filling and heat-sealing of the end 121.

The head 2 is shown under four non-limitative embodiments in FIGS. 3A, 3B, 3C and 3D. It is located at end 122 of the tube distant from the filling end 121, and comprises at least one evacuation orifice 3 for the packaged product and a neck 4 forming a radial extension of orifice 3 and is joined to skirt 1, at least the skirt and neck forming a single-piece assembly.

The neck may have single concavity oriented towards axis XX' of the tune as illustrated, or two successive concavities of opposite direction, causing a concavity inversion in the vicinity of evacuation orifice 3.

The problem encountered when emptying prior art tubes towards the end of use lies in the fact that it is impossible to squeeze the head to evacuate the product still remaining within.

To overcome these problems, the invention has recourse to a particular choice of parameters relating to the general shape of the tube with which it is possible to make use of the deformability of the materials used, and more particularly of the "shape memory" of the basic material of the invention.

The first parameter to be taken into consideration is the joining radius R4 of neck 4 in the longitudinal plane L1 which contains the axial direction XX' and is perpendicular to the transverse direction ZZ', in the zone in which the neck 4 is joined to the skirt.

The second parameter to be taken into consideration is perimeter C1 of the skirt in a transverse plane T perpendicular to the axial direction XX' and located at mid-distance between the end 123 of neck 4 forming the evacuation orifice 3 and the filling end 121.

More specifically, the invention concerns fully emptiable tubes whose C1/R4 ratio of skirt perimeter C1 to the neck joining radius R4 is no more than 4.5.

We will assume that skirt 1 in the entire transverse plane parallel to plane T has a local thickness that is both substantially constant and equal to or very close to the mean thickness of this skirt over its entire length along axis XX'.

According to a first essential characteristic of the invention, the tube wall consists of a mixture of a number "n" at least equal to 1 of polymers belonging to the family of copolymers-olefins prepared from $C_2$ to $C_{10}$ monomers, this mixture comprising at least a first polymer belonging to the family of polypropylenes.

It has become apparent that for one same thickness and one same flexural modulus of the wall, a polypropylene-based, tube conforming to the invention has greater shape memory than a tube in polyethylene, this increased shape memory being characterized by a faster return to initial shape after applying pinching pressure to the tube, in particular at the tube head.

This shape memory is of particular importance for fully emptiable tubes i.e. tubes of the type described and illustrated in European patent application EP 1181207, since the return of such tubes to the initial state after pinching is directly dependent upon the physical properties of the material and more particularly on the responsiveness of the material, whereas this return is spontaneously and easily given by the rigid head in conventional tubes.

According to a second essential characteristic of the invention, the wall in the transverse plane T has a thickness of between 0.30 and 1.2 mm, preferably of between 0.30 and 1.00 mm, and the constituent mixture of this wall has a flexural modulus of no more than 700 MPa, and preferably no more than 500 MPa according to standard NF EN ISO 178, the first and second characteristics being conjointly necessary for the optimised obtaining of the return effect previously mentioned.

A wall is therefore obtained having water barrier properties to meet the demands of user industries, and allowing a return of the tube to its initial state after pinching, especially in the neck zone.

In practice, the constituent mixture of the tube wall may typically have a flexural modulus of between 100 and 350 MPa, preferably between 150 and 300 MPa, according to standard NF EN ISO 178.

A further characteristic of the tube is its length H over axis XX' from the filling end 121 to the end 123 of neck 4 forming the evacuation orifice 3 of the tube.

The invention is applicable in particular to the tube formats currently on the market and can therefore pay heed to a ratio of length H to diameter of between 2.5 and 6, preferably close to 4, for tube capacities typically of between 2 ml and 500 ml.

Depending upon tube capacity and depending upon the ratio of length H to tube diameter, length H may therefore lie between 40 mm and 170 mm, or even reach 250 mm.

The determined perimeter C1 of skirt 1 in the transverse plane T is correlatively greater than 50 mm, 75 mm and 100 mm.

The invention applies more particularly to tubes of large size whose circumference C1 lies between 75 and 190 mm.

In the transverse plane T, the tube has a median wall thickness E of between 0.30 mm and 1.20, preferably between 0.30 and 1.00 mm for a skirt height of between 40 mm and 250 mm respectively, preferably between 40 mm and 200 mm.

More precisely, the median thickness E is preferably equal to the square root of length H, corrected by a multiplier coefficient of between 0.045 and 0.065.

In other words:

$$0.045 \times H^{1/2} =< E =< 0.065 \times H^{1/2}$$

Further advantageously, the multiplier coefficient lies between 0.050 and 0.060 so that:

$$0.050 \times H^{1/2} =< E =< 0.060 \times H^{1/2}$$

To obtain the desired flexibility, the first previously mentioned polymer may consist of a copolymer of propylene and ethylene, preferably a heterophase copolymer of propylene and ethylene.

It was also discovered that it is possible to add to this first polymer a second polymer belonging to the family of linear polyethylenes or polypropylenes and that, under certain conditions, these polymers are perfectly mixable.

Table I below illustrates the results for flexibility and permeability of tubes fabricated by injection and whose basic material comprises at least a first polymer of the polypropylene family. The results are given for three first polymers of different polypropylenes, among which two are associated with a second polymer.

Results regarding tube flexibility are illustrated by the value of the flexural modulus. Permeability results are relative values with respect to a reference 100 which represents the weight loss of a product packaged in a strong barrier tube i.e. conforming to weight loss specifications for a tube of diameter 19 mm, skirt length 56 mm before heat sealing, in which a 5 ml volume of cream has been packaged.

The tube previously filled with the product to be tested, after heat-sealing and closing, is placed in an oven brought to a defined temperature for a defined time.

The base 100 previously cited approximately corresponds to a weight loss of less than 2% for a tube placed in an oven at 50° for 14 days or less than 5% for a tube placed in an oven at 45° for 56 days.

TABLE 1

| | First polymer | | | | | | | |
|---|---|---|---|---|---|---|---|---|
| | CLYRELL EC 140 P (SOLUTION 1) Observed flexural modulus μ: 733 | | | ADFLEX 500 F (SOLUTION 2) Observed μ: 399 | | | | ADFLEX C 200 F (SOLUTION 3) observed μ: 134 |
| | Second polymer | | | | | | | |
| Weight % of second polymer in the mixture | DOWLEX 2035 E (observed μ: 160) | | ADFLEX X 100 G (observed μ: 64) | | AFFINITY EG8200 (observed μ: 13.5) | | ADFLEX X 100 G (observed μ: 64) | | EXACT 0210 | | AFFINITY EG 8200 (observed μ: 13.5) | | | |
| | Flexural modulus* (MPa) | Permeability | Flexural modulus (MPa) | Permeability | Flexural modulus (MPa) | Permeability | Flexural modulus (MPa) | Permeability | Flexural modulus (MPa) | Permeability | Flexural modulus (MPa) | Permeability | Flexural modulus (MPa) | Permeability |
| 0% | 733 | 83 | 733 | 83 | 733 | 83 | 399 | 122 | 399 | 122 | 399 | 122 | 134 | 212 |
| 15% | | | 556 | 108 | 500 | 100 | | | 280 | 146 | 275 | 172 | | |
| 25% | 566 | 87 | 386 | 124 | 407 | 128 | 228 | 143 | 267 | 202 | 226 | 229 | | |
| 33% | | | | 139/148 | 388 | 170 | 184 | 167 | 245 | 221 | 196 | 271 | | |
| 50% | 360 | 101 | 250 | 172 | 221 | 282 | 134 | 210 | | | | | | |

*Flexural modulus: modulus measured according to standard NF EN ISO 178. This modulus may differ from the modulus given in the sales documents of the polymer manufacturers, for low or very low modulus values.

Annex to Table I

First Polymers:
CLYRELL EC 140 P: heterophase copolymer of propylene and ethylene, having an indicated flexural modulus* of 740 MPa, a melt flow index of 16 g/10 mn and marketed by BASELL;

ADFLEX X 500 F: heterophase copolymer of propylene and ethylene, having an indicated flexural modulus 470 MPa according to standard ISO 178, a melt flow index of 7.5 g/10 mn, a density of 0.89 g/cm$^3$ and marketed by BASELL;

ADFLEX C 200 F: heterophase copolymer of propylene and ethylene, having an indicated flexural modulus of 220 MPa according to standard ISO 178, a melt flow index of 6 g/10 mn, a density of 0.890 g/cm$^3$ and marketed by BASELL;

Second Polymers:
DOXLEX 2035E: linear copolymer of ethylene-octene, having a flexural modulus of 240 MPa according to standard ASTM D638, a melt flow index of 6 g/10 mn, a density of 0.919 g/cm$^3$ and marketed by DOW;

ADFLEX X 100 G: heterophase copolymer of propylene and ethylene, having an indicated flexural modulus of 80 MPa, a melt flow index of 8 g/10 mn, a density of 0.890 g/cm$^3$, and marketed by BASELL;

AFFINITY EG 8200: linear copolymer of ethylene-olefin, having an indicated flexural modulus of 20 MPa according to standard ASTM D790, a melt flow index of 5 g/10 mn, a density of 0.870 g/cm$^3$ and marketed by DOW;

EXACT 0210: linear copolymer of ethylene-octene, having a flexural modulus of 65 MPa according to standard ISO 178, a melt flow index of 10 g/10 mn, a density of 0.902 g/cm$^3$, and marketed by DEXPLASTOMERS;

The viscosity index is given in g/10 mn according to standard ISO 1133.

* the "indicated" flexural modulus is given in the supplier's documents. The flexural modulus observed by the applicant for this product in Table 1 is the modulus measured in accordance with standard NF EN ISO 178.

Table I shows the choices of possible materials in relation to tube size and the targeted imperviousness.

It is to be noted firstly that the measured flexural modulus values shown in the document and the calculated permeability indexes lie within the sphere of desired objectives for maximum weight losses in relation to tube capacity and desired wall flexibility.

It is also to be noted beforehand, that for all examined solutions the relationship was ascertained between the increase in wall flexibility and the increase in weight loss attributable to wall porosity.

The weight losses mentioned in Table I are given for guidance purposes for a given cream, a given tube and given conditions of weight loss measurement (oven temperature and study period).

The first polymer used belongs to the family of polypropylenes. It preferably consists of a heterophase copolymer of ethylene and propylene.

When the most rigid polypropylene belongs to the family of heterophase copolymers of ethylene and propylene, it is possible to reduce the percentage of the most flexible polymer in the mixture, and hence to reduce the porosity of the wall, for a given targeted flexibility.

In Table 1, the first polymer which is the most rigid of polymers in the polypropylene family, has an indicated flexural modulus in solution 1 of 740 MPa, and measured at 733 MPa, of between 850 and 500 Mpa, and in solution 2 an indicated flexural modulus of 470 Mpa and measured at 399 MPA, less than 500 MPa.

Analysis of Table 1 leads to ascertaining that with the material chosen in solution 1, after mixing and for resulting flexural modulus values of the material in the order of 350 MPa, it is possible to achieve weight losses in the order of 100 to 130 and hence to obtain materials with a strong water barrier.

Similarly, with the material chosen in solution 2, after mixing and for resulting flexural modulus values of the material in the order of 200 MPa, i.e. between 100 and 350 MPa, preferably between 150 and 300 MPa, i.e. very flexible for the previously defined wall thickness E, it is possible to achieve weight losses of between 150 and 250 i.e. lying without reservation within the scale enabling qualification of the material for large-sized tubes.

It is a particularly effective solution for obtaining a rapid return of the wall to its initial state in the neck zone, while having a qualified material with respect to the, weight loss of the packaged product.

For each solution of N°1 type (giving priority to the barrier effect) or solution of n°2 type (giving priority to wall flexibility) the first polymer was softened by means of a second polymer belonging to the polypropylene or polyethylene family.

When the flexural modulus of the second polymer is greater than 70 MPa, this polymer can be integrated to the proportion of 15% to 85% in the mixture, preferably 25% to 75%. This gives material of average flexibility with a strong water barrier.

When it is a very flexible material that is sought, a second polymer is used whose flexural modulus is less than 70 MPa. It was found in accordance with the results of Table 1 that the weight loss of the cream contained in the tube increases very rapidly when the proportion of the second polymer is strongly increased. Therefore the percentage of said polymer in the mixture must be limited to a maximum of 50%, this percentage preferably lying between 15% and 40%.

To limit the percentage of the second polymer in the mixture to less than 50%, preferably the first polymer used is as flexible as possible.

When it is sought to give priority to softness to the touch, the second family belongs to the polyethylene family. A linear $C_4$ to $C_{10}$ ethylene-olefin copolymer is chosen, preferably an Ethylene Octene copolymer whose melt flow index guarantees resistance to stress-cracking of the mixture, its melt flow index (MFI) lying between 3 and 15 g/10 mn, preferably between 4 and 12 g/10 mn.

When it is sought to give priority to rapid return of the wall to its initial state after pinching, the second polymer belongs to the polypropylene family. Preferably a heterophase copolymer of propylene and ethylene is chosen.

Finally, as evidenced in Table 1, some polypropylenes have a sufficiently low flexural modulus for use without mixing with a second polymer.

When it is desired to use a strong barrier material, a material that is relatively little flexible material is used, close to the upper limit of 500 MPa, for example for a small tube (of diameter 19 mm) having a wall thickness of less than 0.65 mm. In this case the first polymer is used without the addition of a second polymer.

The other criteria of choice possibly involved in defining the family of the second polymer relate to the secondary barrier effects, of ester barrier type, oxygen barrier or barrier against any other component of the product contained in the cream, and to the effects of yellowing of the wall under the effect of any of the components of the product contained in the tube or under the effect of any external contaminant agent during use of the tube by the consumer.

Finally, consideration may be given to the secondary effects such as crease memory or whitening of the wall in the zones undergoing deep creases, these effects being very strongly attenuated even eliminated by means of the polypropylenes characterized in the invention.

Generally, it will have been easily understood that to optimise any solution it is preferable to use materials whose characteristics are as close as possible and hence to use polymers whose flexural modulus values are as close as possible.

Also, it is recommended only to use polypropylenes whose melt flow index is compatible with the flow pathway defined by the length and thickness of the wall, and able to resist stress-cracking, i.e. having a melt flow index (MFI) measured in accordance with standard ISO 1133 that is less than 100 g/10 mn, preferably less than 20 g/10 mn.

If it is sought to give priority to comfort of use of the tube with respect to its capacity, it is possible to give the C1/R4 ratio of the skirt perimeter C1 to the neck joining radius R4 a value of less than 3, preferably of between 0.5 and 2 so as to improve the return effect while maintaining a capacity close to that of equivalent tubes of conventional shape.

In addition, the neck may advantageously, in the longitudinal plane L1 of the tube, have a radius of curvature which increases continuously in a direction leading from the evacuation orifice towards the skirt.

Neck 4 may also, with respect to the axial direction XX', have a maximum incline A of no more than 35°, or even of no more than 30°.

Also, skirt 1 of the tube may be defined by a generatrix non parallel to the axial direction XX' before heat-sealing of end 121, this solution making it possible to increase the radius R4, hence to reduce the ratio C1/R4 and consequently to improve comfort of use.

Therefore the generatrix G of skirt 1 may, before heat sealing of end 121 and with respect to the axial direction XX', have a maximum incline (B) of no more than 2°, preferably close to 1° or even 0.5°, a solution which offers the best compromise between the reduction in tube capacity and improvement in comfort of use, in accordance with the drawing shown FIG. 4.

Preferably, the generatrix of skirt 1, before heat sealing of end 121, is a straight line so as to facilitate, during a subsequent operation, the decoration of the tube (offset, serigraphy, heat transfer or other . . . ).

To further strengthen the "return" effect provided by the invention, it is possible (FIG. 4A) to provide that the skirt 1, at the point where it joins the neck 4, has a substantially constant wall thickness having a first value E1 that is substantially constant and substantially identical to the median thickness E in plane T, that the neck 4 at the point where it joins skirt 1, has a wall thickness of value E1 and, in the vicinity of its end 123 closing orifice 3, has a wall thickness having a second value E2 greater than E1, and that the wall thickness of the neck gradually decreases from E2 to E1 from the evacuation orifice 3 as far as a point D of the neck distanced from the joining of the neck 4 with skirt 1 by a non zero distance d.

Figure 3A:
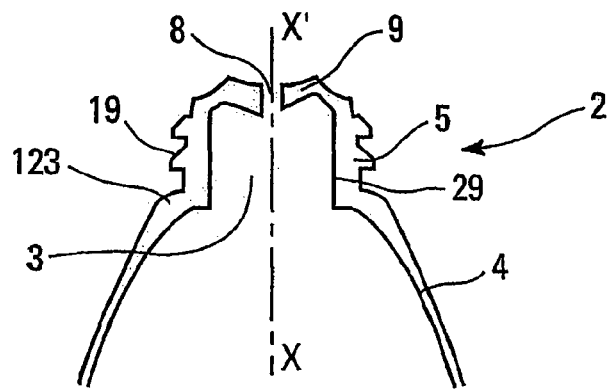
FIG. 3A is a cross-sectional view of the tube head, according to a first embodiment, the head comprising securing means of nozzle type and a reducer, the tube, nozzle and reducer forming a single-piece assembly formed by injection in a single operation.

Preferably, the ratio of the second thickness value E2 to the first thickness value E1 is no more than 2.5, preferably no more than 1.5 in accordance with the cross-sectional view shown FIG. 3A.

Unlike a tube of "conventional" shape whose head wall is thick, hence forming a strong barrier, it is also preferable for the fully emptiable tube to be coated with a barrier varnish over its entire surface including neck 4.

Also, the tube of the invention is injectable, the head and the skirt being injected in a single operation, using very high injection pressures. In the invention, the pressures used are in the order of 1250 to 2500 bars taking into account wall thickness and the viscosity of the polymers used.

The wall may be simultaneously softened through the addition of a polymer having a greater or lesser ethylene content, as described previously, but also through thinning the wall in particular at the time of fabricating tubes with long skirt. Under constant injection pressure, the increase in the flow pathway leads to an increase in wall thickness and hence to an increase in its rigidity. Softening of the wall can then be obtained by increasing the injecting pressure and reducing wall thickness.

Since the injected materials can withstand injection pressures of 1250 to 2500 bars, injection being performed in accordance with rules of the art, these pressures are used to reduce the thickness of the tube wall and to increase flexibility without reducing the flexural modulus and hence limiting degradation of weight loss.

Some tubes are injected in a mould such as shown FIG. 5A consisting of a core denoted 6 and an impression denoted 7 in which the injection nozzle 9 enters i.e. the channel through which the molten plastic material is led into the cavity defined by the impression and core. Under the effect of the very high injection pressure needed to inject the material into the wall thickness optimised to improve tube flexibility, the core of the mould tends to deflect towards the impression. This gives rise to a wall of variable thickness and hence of variable flexibility. This is highly detrimental to the comfort of the tube user and quality of the desired "return" effect in the neck zone, a variation in wall thickness in the neck area even a very small variation possibly inducing sticking after pinching of this wall preventing or strongly slowing down the return to initial shape. Also the off-centring of the core generates preferential material flows during the injection of the skirt, preferential flows which join together as "weld lines", these "weld lines" forming zones of non-resistance to stress-cracking.

It is therefore very important for the tube wall to be of substantially constant thickness especially in the neck zone.

A first injection mould for obtaining this result is of the type shown FIG. 5B. As can be seen FIG. 5B, this mould comprises a central part denoted 10. The central part 10 of core 6 has a free end denoted 11 which centre bears upon the impression 7.

The centre bearing of the core on the impression conjugated with use of the polypropylene makes it possible to obtain the wall thickness E previously defined and hence to obtain the sought after "return" effect without off-setting of the core under the effect of the pressures used of between 1250 and 2500 bars.

To proceed with injecting the material from the central point of injection 15 as far as the tube head, radial supply channels are created in the free end 11 of the central part 10 of the core. The supply channels 12 and the bearing zones 14 of the free end 11 of the central part 10 are better visible in FIG. 7 which is an enlarged view of the part denoted VII in FIG. 5.

However, the use of this technique has the drawback of creating as many skirt supply points as there are channels 12 between the injection point and the tube head.

As shown in FIG. 6, three separate sheets of material 33 are created, supplied by the three flows of material 320, corresponding to the three channels 12, the sheets being joined together by three weld lines 36 and forming the tube skirt at the end of the injection operation.

Another solution consists of off-centring injection point 15, for example non-limitative fashion, by its duplication and by placing each injection point in the continuation of wall 29 parallel to axis XX' at end 122 of the tube.

This possible but non-preferred solution, highly complicates the mould injection system, risks deteriorating resistance to stress-cracking of the weld lines, but makes it possible to eliminate the supply channels 12 while maintaining the centre bearing 11 of the core on the impression.

The weld lines 36 have the disadvantage of creating skirt zones with non-resistance to stress-cracking, this disadvantage being attenuated through the use of polypropylene which is more resistant than polyethylene to stress-cracking.

To overcome this drawback, the invention specifies the shape details of the tube and corresponding methods which make it possible to attenuate the weld lines while maintaining the essential bearing of the core on the impression.

The shape details of the tube and corresponding mould are now described with reference to FIGS. 8, 9, 9A and 10.

Figure 10:
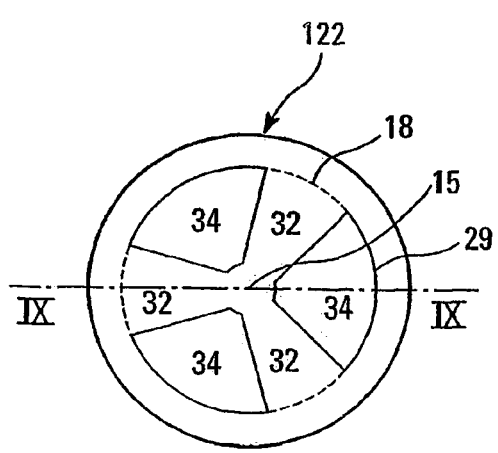
FIG. 10 is an overhead view of the upper face of the tube when the mould core is in centre bearing on the impression of this mould.

End 122 of the tube is at least formed of sectors 32 corresponding to channels 12 made in the free end 11 of the central part 10 of the core, in accordance with FIG. 10.

Firstly, in order to facilitate the reconstruction of a circular flow of material 17 from the joining points between the radial injection channels and the upper part of the head, it is of advantage to form a joining line that is as wide as possible between each radial injection channel and the upper part of the tube head in accordance with FIG. 10.

One advantageous solution consists of providing accumulated joining widths for sectors 32 at the joining point 18 with face 29 parallel to axis XX' of orifice 3, which represent at least 15% of the perimeter of face 29.

Another solution further improving circular supply, but reducing the bearing surface of the core on the impression, consists of increasing the accumulated joining widths of the supply sectors at the joining point 18 with face 29 to more than 25% of the perimeter of the wall.

In order to preserve a maximum bearing surface of the core on the impression while maximizing the accumulated joining widths of sectors 32 with face 29, it is advantageous to give sectors 32 an increasing width from the injection point 15 to the joining point 18 with the wall of the orifice.

Also, still in order to promote the reconstitution of a circular flow of matter, it is advantageous to provide an annular throttle zone Z located on the wall of the orifice, beyond the joining zone of sectors 32.

Finally, to further increase the effect of circular distribution, it is advantageous to extend the wall by a ring of material W located in a plane parallel to plane T, under the end 123 of the neck.

Figure 8:
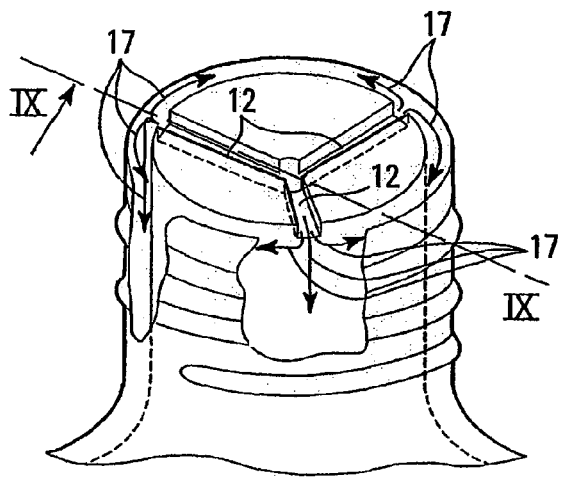
FIG. 8 schematically shows a perspective view of the mould head to be used for injecting the tube of the invention according to a first embodiment.

After injection of the tube skirt and head, the central part 10 of the core centre bearing upon impression 7, it will be easily understood that the wall of end 122 of the tube, show in a non-limitative example in FIG. 10, projected onto a plane perpendicular to axis XX', consists of sectors 32 corresponding to the supply channels 12 shown FIG. 8.

Wall 122 therefore has gaps in sectors 34 which correspond to bearing zones 14 of the free end 11 of the central part 10 on the impression 7.

It is possible to make the central part 10 of core 6 mobile with respect to the peripheral core and to form the apex wall 122 of the tube without any gaps by drawing backwards the mobile central part 6 of the core over a distance corresponding to the desired thickness of this apex wall.

Figure 9A:
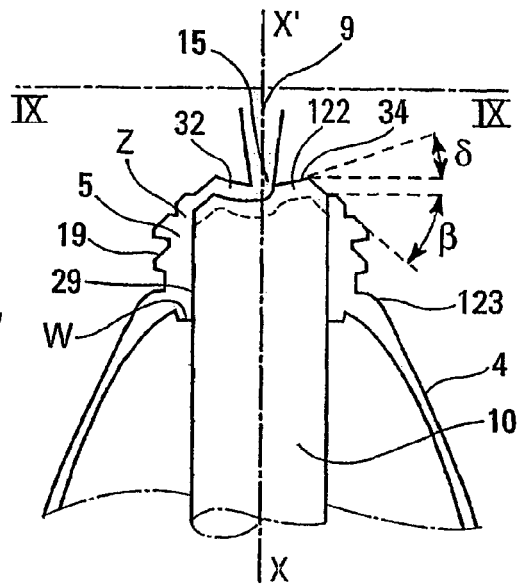
FIG. 9A is a cross-sectional view of the tube head and corresponding zone of the mould, fabricated according to another embodiment and as seen during the injection phase of the tube skirt along the same axis IX-IX.
Figure 9:
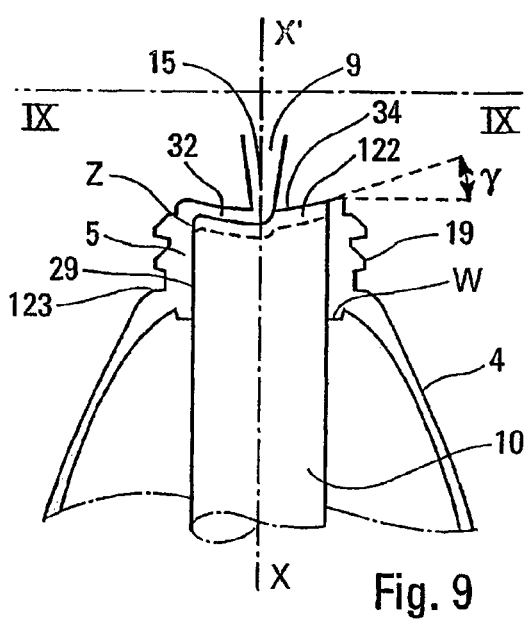
FIG. 9 is a cross-sectional view of the tube head and corresponding zone of the mould, fabricated according to a first embodiment of the tube, and as seen during the injection phase of the tube skirt, along axis IX-IX in FIG. 8.

In a first version illustrated FIG. 9, the free end 11 of the central part 10 of the core is designed in the shape of a sunken cone, the angle γ formed by the bearing surface of the free end 11 of central part 10 on impression 7 with the plane perpendicular to the longitudinal axis XX' of the tube being less than 45°, preferably between 15° and 20° to offer optimum user comfort.

This version is adapted for tubes of small size. It is more difficult to implement for large size tubes. For tubes of large size the length of the central part 10 of the core and the types of steel chosen are such that the central core is compressed under the injection pressure of between 1200 and 2500 bars so that centring cannot be ensured with a bearing slope of between 15° and 20°, a bearing slope of between 35° and 45° being required to offset core compression.

In a second version illustrated FIG. 9A, and applicable to large size tubes, the free end 11 of the central part 10 is in the shape of a projecting cone frustum, the angle β formed by the bearing surface of the projecting cone frustum on impression 7 with the plane perpendicular to longitudinal axis XX' of the tube lying between 35° and 45°.

In this same version, the free end 11 of the central part 10 is in the shape of a sunken cone in its part internal to the projecting cone frustum, the angle δ formed by the bearing surface of the sunken cone of free end 11 of central part 10 on impression 7 with the plane perpendicular to longitudinal axis XX' of the tube being less than 45°, preferably between 15° and 20°.

After retraction of the central core, the wall 122 is in the shape of a projecting cone frustum in its peripheral part and cup-shaped in its central part.

Therefore in this second version, the shape given to end 122 of the tube makes it possible simultaneously to optimise centring of the core during the injection operation and to offer optimal user comfort.

In this first version, (FIG. 11A) and this second version (FIG. 3A) the tube head comprises a single-piece securing means of nozzle type 5 and a single-piece reducer 9, the nozzle and the reducer being positioned in the continuation of orifice 3 on axis XX', the apex wall 122 of the tube forming the reducer 9, the orifice 8 of the reducer being obtained by cutting after forming the tube by injection, the tube, nozzle and reducer thereby forming a single-piece assembly formed by injection in a single operation.

Finally, the tube usually being closed by capping means 35 of "service" cap type or "standard" cap type, a first solution consists of joining the tube and cap by means of a screw assembly for example.

The single-piece tube head being made in the same flexible, elastic material as the skirt, the constituent material of the head and in particular the screw pitch may creep under the effect of the force resulting from tightening of the cap onto the tube.

Figure 11A:
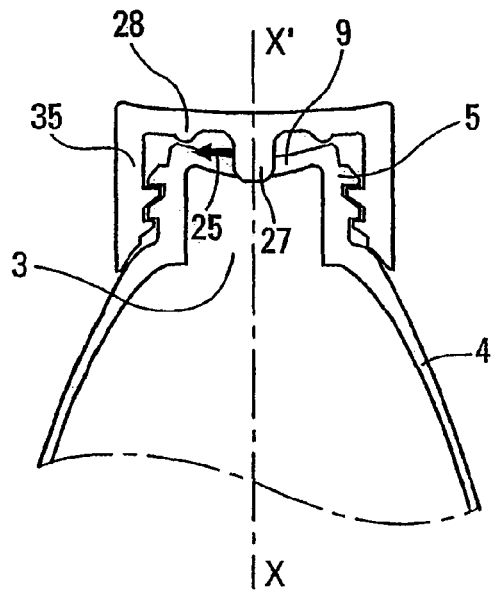
FIGS. 11A, 11B, 11C and 11D are four cross-sectional views showing four examples of assembly of the tube of the invention with an added accessory, the tubes conforming to the embodiments shown FIGS. 3A, 3B, 3C and 3D.
Figure 11B:
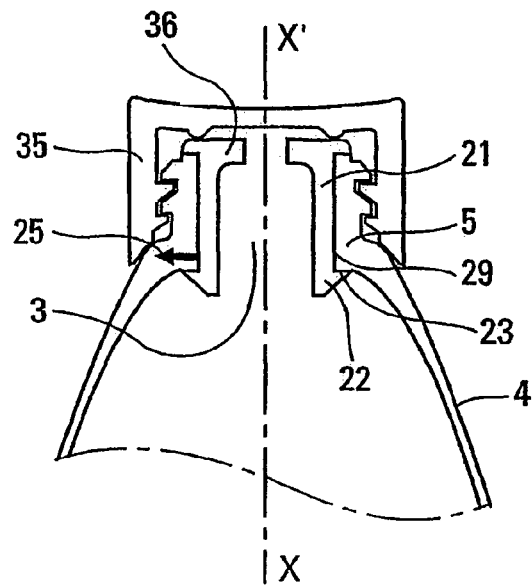
Figure 11D:
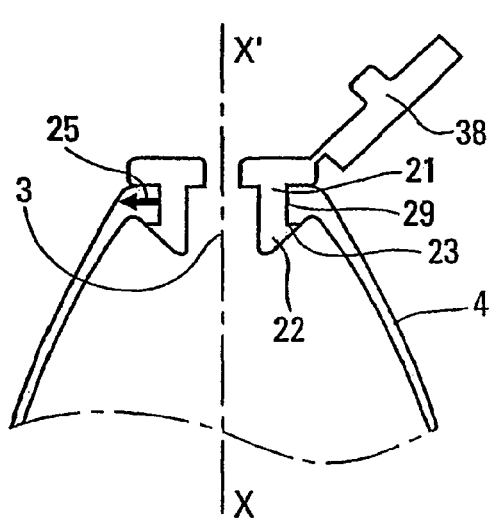
Figure 11C:
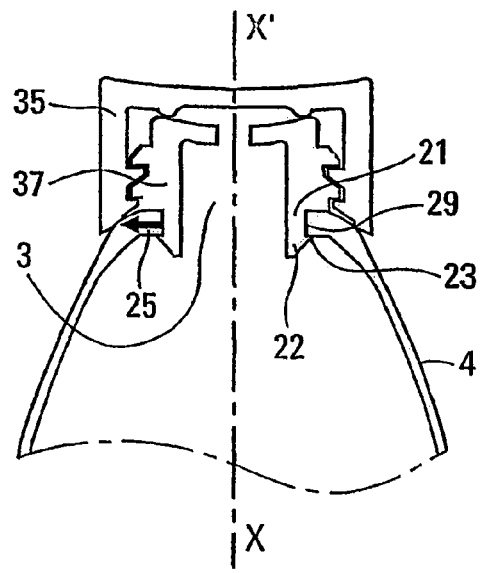

To overcome this shortcoming, two arrangements are preferred in accordance with the drawing in FIG. 11A.

Firstly the screw thread 19 is a thread of asymmetric type in accordance with the drawings in FIGS. 3A, 9 and 9A.

Secondly, imperviousness is ensured by means of a tip 27 of conical shape arranged on the capping means 35, the seal being ensured by placing the wall of the single-piece reducer 9 under centrifugal radial tension 25 when tip 27 enters the opening orifice 8 of the reducer as shown FIG. 11A.

In this preferred solution the bearing of the capping means on the tube is ensured by means of a bearing ring 28 located on the inner periphery of cap 35 and bearing on the peripheral zone of the reducer.

Figure 3B:
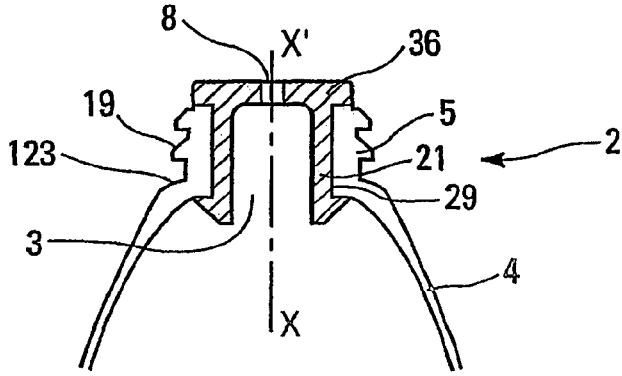
FIG. 3B is a cross-sectional view of the tube head, according to a second embodiment, the head comprising securing means of nozzle type and a reducer, the tube and the nozzle forming a single-piece assembly formed by injection in a single operation, and the reducer being added.

In a third version, the head comprises single-piece securing means of nozzle type 5 positioned in the continuation of orifice 3 on axis XX', the tube and securing means 5 forming a single-piece assembly made in a single injection operation as shown FIG. 3B, the head possibly being fitted with an added accessory of added reducer or nozzle tip type.

Figure 3C:
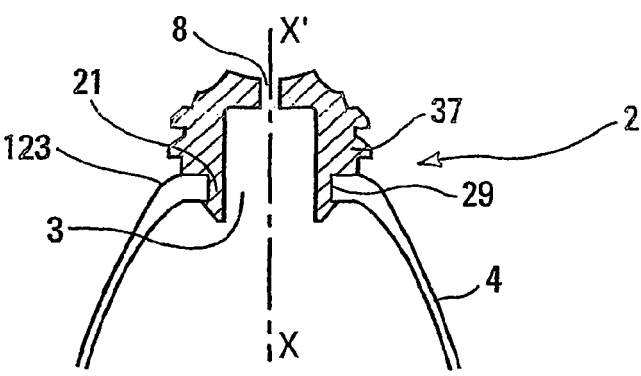
FIG. 3C is a cross-sectional view of the tube head, according to a third embodiment, the head comprising securing means of nozzle type forming a reducer, and the nozzle being added.
Figure 3D:
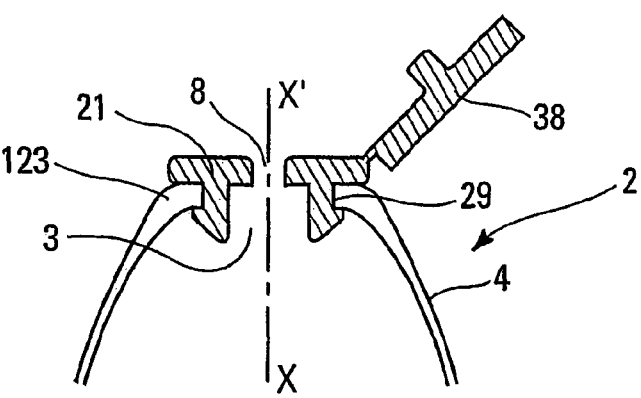
FIG. 3D is a cross-sectional view of the tube head, according to a fourth embodiment, the head comprising a non-removable cap of service cap type, and the non-removable cap being added.

In a fourth version, the head is fitted with an added accessory of dispensing-means type of added reducer type or added nozzle tip or other, securing means of screw nozzle type or other, capping means of service cap type or other as shown in non-limitative fashion in FIGS. 3C to 3D.

In either one of these versions, the head is fitted with the added accessory forming an added reducer 36, added nozzle forming a reducer 37, service cap 38, the added accessory being positioned in the continuation of orifice 3 on axis XX', the accessories 36, 37 and 38 forming non-limitative examples.

When the head is fitted with an added accessory 36, 37 or 38, the invention preferably provides that the accessory is equipped with a chimney 21 whose outer face is conjugated with the face 29 parallel to axis XX' of orifice 3, after inserting the chimney 21 inside orifice 3 to ensure securing of the accessory on the tube, the chimney placing the wall 29 of the orifice under centrifugal radial tension 25.

Since the wall of the tube of the invention is made in a flexible material, the described solution makes it possible to avoid a gaping or more seriously a faulty seal or disassembly of the tube from the added accessory when the consumer presses on the wall of the tube. In addition, the proposed solution takes advantage of the flexibility of the material of the invention to ensure the resistance of the accessory.

Preferably, the chimney 21 is fitted with a device of conical shape 22 to ensure its insertion into orifice 3.

Further preferably, the outer face of the chimney 21 is radially recessed 23 from the device 22, the counter-back taper 23 locking the added accessory in axis XX', the added accessory then being non-removable.

In either of these versions 3 and 4, the tube and the added accessory have conjugate means to ensure the imperviousness of the assembly and optionally to prevent rotation of the added accessory with respect to the tube.

The invention claimed is:

1. A fully emptiable tube provided with a wall resistant to stress-cracking and forming a water barrier, said tube comprising a flexible skirt and a head manufactured in a single piece, the flexible skirt being elongate in an axial direction and having, at one end of the tube, a filling end sealed by crushing the flexible skirt along a transverse direction and the head comprising at least one evacuation orifice and a flexible neck forming a radial extension of the at least one evacuation orifice and connecting with the flexible skirt, at least the flexible skirt and flexible neck forming a single-piece assembly, a wall at the joining of the flexible neck with the flexible skirt in a longitudinal plane containing the axial direction and perpendicular to the transverse direction having a determined joining radius, and the flexible skirt in a plane transverse to the axial direction and at mid-distance between an end of the flexible neck forming the at least one evacuation orifice and the filling end of the tube having a determined perimeter and a substantially constant wall thickness, the ratio of the determined perimeter to the joining radius being at least equal to 4.5, wherein the wall in the transverse plane has a median thickness of between 0.30 mm and 1.20 mm, wherein the tube consists of a mixture of a number "n" where n is at least equal to 1 of the polymers belonging to a family of copolymers-olefins prepared from $C_2$ to $C_{10}$ monomers, wherein at least a first polymer of the mixture belongs to the polypropylene family, and wherein the constituent mixture of the tube wall has a flexural modulus of no more than 700 MPa according to standard NF EN ISO 178, and wherein the first polymer is a heterophase copolymer of propylene and ethylene.

2. The tube according to claim 1, wherein the median thickness is between 0.30 mm and 1.0 mm.

3. The tube according to claim 1, wherein the flexural modulus is no more than 500 MPa according to said standard.

4. The tube as in claim 1, wherein the tube contains a second polymer consisting of a heterophase copolymer of propylene and ethylene.

5. The tube as in claim 1, wherein said tube contains a second polymer consisting of a linear $C_4$ $C_{10}$ copolymer of ethylene-olefin.

6. The tube as in claim 1, wherein the constituent mixture of the tube wall has a flexural modulus of between 100 and 350 MPa according to said standard NF EN ISO 178.

7. The tube as in claim 1, wherein the constituent mixture of the tube wall has a flexural modulus of between 150 and 300 MPa according said standard NF EN ISO 178.

8. The tube as in claim 1, wherein the length, defined as the distance between the end of the neck and the filling end along an axis is between 40 mm and 170 mm, and wherein the wall in the transverse plane has a median thickness equal to the square root of the length corrected by a multiplier coefficient of between 0.045 and 0.065.

9. The tube as in claim 8, wherein the multiplier coefficient is between 0.050 and 0.060.

10. The tube as in claim 1, wherein the ratio of the determined perimeter to the joining radius is less than 3.

11. The tube as in claim 10, wherein the ratio of the determined perimeter to the joining radius is between 0.5 and 2.0.

12. The tube as in claim 1, wherein the neck, with respect to the axial direction), has a maximum incline of no more than 35°.

13. The tube as in claim 12, wherein the maximum incline is no more than 30°.

14. The tube as in claim 1, wherein the skirt, before sealing the filling end, is defined by a generatrix non-parallel to the axial direction.

15. The tube as in claim 14, wherein the generatrix of the skirt, before sealing the filling end, has a maximum incline of no more than 2° with respect to the axial direction.

16. The tube as in claim 15, wherein the maximum incline is about 0.5°.

17. The tube as in claim 15, wherein before sealing the end of the skirt, the generatrix of the skirt is a straight line.

18. The tube as in claim 1, wherein the skirt, as far as its joining with the neck, has a wall thickness having a first value that is substantially constant and substantially identical to the median thickness, wherein the neck in the vicinity of its end forming the at least one evacuation orifice has a wall thickness having a second value greater than the first value, and wherein the wall thickness of the neck decreases gradually from the second value to the first value from end to a point of the neck located at a determined distance from the joint between the neck and the skirt.

19. The tube as in claim 18, wherein the ratio of the second wall thickness value to the first wall thickness value is no more than 1.5.

20. The tube as in claim 1, wherein the tube is coated with a barrier varnish over its entire surface including the neck.

21. The tube as in claim 1 wherein the tube is obtained by injecting into an injection mould comprising a core and an impression, the core itself comprising a central part of which one free end center bears upon the impression at least during the tube skirt injection phase.

22. The tube as in claim 21, wherein the free end of the central part of the core comprises supply channels, and wherein the tube has an apex wall at its injection end formed at least in part of sectors corresponding to the supply channels.

23. The tube as in claim 21, wherein the central part of the core of the injection mould is mobile, and wherein the apex wall of the injection end of the tube is formed without any gaps, after drawing backwardly the mobile central part over a distance corresponding to the desired thickness for said apex wall.

24. The tube as in claim 21, wherein the free end of the central part of the core is in the shape of a sunken cone, and further comprising an angle (γ) formed by a bearing surface of the free end on the impression with the plane perpendicular to the longitudinal axis of the tube being less than 45°.

25. The tube as in claim 24, wherein the angle (γ) is between 15° and 20°.

26. The tube as in claim 21, wherein the free end of the central part of the core is in the shape of a projecting cone frustum, and further comprising an angle (β) formed by a bearing surface of the projecting cone frustum of the free end on the impression with the plane perpendicular to the longitudinal axis of the tube lying between 35° and 45°.

27. The tube as in claim 26, wherein the free end of the central part of the core is in the shape of a sunken cone in its part internal to the projecting cone frustum, the angle (δ) formed by the bearing surface of the sunken cone of the free end on the impression with the plane perpendicular to the longitudinal axis of the tube being less than 45°.

28. The tube according to claim 27, wherein the angle (δ) is between 15° and 20°.

29. The tube as in claim 21, wherein the head comprises single-piece securing means of a nozzle type and a single-piece reducer, the nozzle and the reducer being positioned in a continuation of an orifice along the longitudinal axis, an apex wall of the nozzle forming the reducer, the orifice of the reducer being obtained by cutting after forming the tube by injection, and the tube, nozzle and reducer thereby forming a single-piece assembly formed by injection in a single operation.

30. The tube as in claim 21, wherein the head comprises single-piece securing means of a nozzle type positioned in a continuation of the at least one orifice along the longitudinal axis, and the tube and the securing means forming a single-piece assembly formed by injection in a single operation.

31. The tube as in claim 29, wherein the wall of the single-piece nozzle carries an asymmetric thread.

32. The tube as in claim 30, wherein the wall of the single-piece nozzle carries an asymmetric thread.

33. The tube as in claim 1, wherein the tube is provided with an added accessory of dispensing type of added reducer or added nozzle tip type, or securing means of added nozzle type forming a reducer or nozzle tip type, or capping means of service cap type, the added accessory being positioned in a continuation of the orifice along the longitudinal axis.

34. The tube as in claim 33, wherein the added accessory is provided with a chimney of which an outer face is conjugated with a face parallel to the longitudinal axis of the orifice, after inserting the chimney inside the orifice.

35. The tube as in claim 34, wherein the added accessory is non-removable and in that the chimney of the added accessory is provided with a penetration device of conical shape, and an outer face of the chimney being radially recessed with respect to the penetration device.

36. The tube as in claim 1, wherein the determined perimeter of the skirt in the transverse plane lies between 75 mm and 190 mm.

37. The tube as in claim 1, wherein the neck, in the longitudinal plane, has a radius of curvature that increases continuously in a direction leading from the at least one evacuation orifice towards the skirt.

38. A method for fabricating a flexible, fully emptiable tube consisting of a skirt and a head comprising at least one evacuation orifice and a neck forming a radial extension of the orifice and being joined to the skirt, the skirt and the neck forming a single-piece assembly resistant to stress-cracking and forming a water barrier, comprising the steps of:

using as constituent material of a wall of the tube a mixture of a number "n" where n is at least equal to 1 of polymers belonging to the family of copolymers-olefins prepared from $C_2$ to $C_{10}$ monomers, a first polymer belonging to the polypropylene family, wherein the first polymer is a heterophase copolymer of propylene and ethylene, the mixture of polymers having a flexural modulus of no more than 700 MPa, and the wall having a thickness of between 0.30 and 1.20 mm; and fabricating the skirt and head of the tube as a single piece by injecting the mixture, in a single injection operation, into an injection mould comprising an impression and a core, said core comprising a central part of which one free upper end center bears upon the impression at least during the skirt injection phase.

39. The method according to claim 38, wherein the using step comprises using a mixture of polymers having a flexural module no more than 500 MPa and the wall has a thickness of between 0.30 and 1.0 mm.

* * * * *